(12) United States Patent
Murata et al.

(10) Patent No.: US 8,009,246 B2
(45) Date of Patent: Aug. 30, 2011

(54) LIQUID CRYSTAL DISPLAY DEVICE COMPRISING REFLECTING PORTIONS FOR REFLECTING LIGHT BEAMS AND FOCUSING THEM ON CIRCUMFERENCES OF ELECTRODE PORTIONS OF LINEAR LIGHT SOURCES

(75) Inventors: Seiji Murata, Yokohama (JP); Yasutaka Tsuru, Kawasaki (JP); Satoshi Ouchi, Kamakura (JP); Mayumi Nagayoshi, Chofu (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 12/129,743

(22) Filed: May 30, 2008

(65) Prior Publication Data

US 2008/0297683 A1   Dec. 4, 2008

(30) Foreign Application Priority Data

Jun. 1, 2007 (JP) ................................ 2007-146610
Feb. 1, 2008 (JP) ................................ 2008-022270

(51) Int. Cl.
*G02F 1/1335* (2006.01)
*G02F 1/1333* (2006.01)
*F21V 7/04* (2006.01)

(52) U.S. Cl. ............................ 349/67; 349/58; 362/609

(58) Field of Classification Search ............. 349/58–60, 349/67; 362/609
See application file for complete search history.

(56) References Cited

U.S. PATENT DOCUMENTS

| 2005/0243554 A1* | 11/2005 | Jeong | 362/260 |
| 2007/0030663 A1* | 2/2007 | Ryu | 362/29 |
| 2008/0252810 A1* | 10/2008 | Ito et al. | 349/60 |

FOREIGN PATENT DOCUMENTS

| JP | 07-169309 | 7/1995 |
| JP | 11-84377 | 3/1999 |
| JP | 2004-109205 | 4/2004 |
| JP | 2006-11445 | 4/2006 |
| JP | 2006-259750 | 9/2006 |

* cited by examiner

*Primary Examiner* — Mark A Robinson
*Assistant Examiner* — Dennis Y Kim
(74) *Attorney, Agent, or Firm* — Antonelli, Terry, Stout & Kraus, LLP.

(57) ABSTRACT

A direct type backlight unit used in a liquid crystal display device is provided which can suppress lowering of luminance at an electrode portion of a linear light source. A reflecting plate is formed on a side wall of a box-shaped reflector close to an end of a linear light source. The reflector reflects light beams from the linear light source to be guided toward a liquid crystal panel. The reflecting plate on the side wall has at least two inclined surfaces. The inclined surfaces may have a stepped shape or a convex ridge shape. According to this arrangement, it is possible to reduce or eliminate decrease of the luminance level at ends of an effective display area of a liquid crystal panel.

9 Claims, 9 Drawing Sheets

LIQUID CRYSTAL DISPLAY DEVICE COMPRISING REFLECTING PORTIONS FOR REFLECTING LIGHT BEAMS AND FOCUSING THEM ON CIRCUMFERENCES OF ELECTRODE PORTIONS OF LINEAR LIGHT SOURCES

INCORPORATION BY REFERENCE

The present application claims priorities from Japanese applications JP2007-146610 filed on Jun. 1, 2007, JP2008-022270 filed on Feb. 1, 2008, the contents of which are hereby incorporated by reference into this application.

BACKGROUND OF THE INVENTION (1) Field of the Invention

The present invention relates to a liquid crystal display device, and more particularly, to a direct type backlight unit used in a liquid crystal display device and a liquid crystal display device having the same.

(2) Description of Related Art

As a liquid crystal panel used in liquid crystal display devices, a passive matrix type panel and an active matrix panel using thin film transistors (TFT) are known. However, such liquid crystal panels are not of an emissive type and therefore require an additional illumination light source to visualize images formed on the liquid crystal panels.

Therefore, a liquid crystal display device includes a liquid crystal display panel having a drain driver and a gate driver arranged at its circumference and a backlight unit (hereinafter, sometimes referred to as BLU) for irradiating the liquid crystal display panel.

The BLU is classified into a side-light type BLU and a direct type BLU. In recent years, liquid crystal display devices are becoming bulky and larger in screen size. In such bulky and large-screen liquid crystal display devices, a direct type BLU is suitable because it can provide high luminance output. A liquid crystal display device using the direct type BLU is disclosed in JP-A-2006-259750 and JP-A-11-084377, for example.

SUMMARY OF THE INVENTION

A direct type BLU includes one or plural linear light sources (for example, cold cathode fluorescent lamp), an optical element including a diffusion plate on which light beams irradiated from the linear light sources are incident, and a reflector (an reflecting element) having a reflecting surface for reflecting light beams irradiated from the linear light sources onto a side opposite to a liquid crystal display panel toward the liquid crystal display panel.

In recent years, large-screen liquid crystal display devices are requested to be small in thickness. However, in order to make large-screen liquid crystal display devices small in thickness, it is necessary to make the direct type BLU small in thickness. When the direct type BLU is made small in thickness; that is, when the distance between an optical element and a reflector is decreased, there is a problem that a luminance distribution in a display surface of a liquid crystal display panel becomes uneven. Such an uneven luminance distribution is remarkable particularly at end surfaces of the liquid crystal display panel, and a decrease of the luminance level at both end surfaces in the longitudinal direction of a linear light source is problematic.

Such an uneven luminance distribution is remarkable particularly at end surfaces of the liquid crystal display panel, and a decrease of the luminance level at both end surfaces in the longitudinal direction of a linear light source (for example, EEFL (External Electrode Fluorescent Lamp)) is problematic. In addition, when an electrode portion disposed at both ends or one end in the longitudinal direction of the linear light source is located within an effective range of the BLU, since the electrode does not emit light beams, the electrode portion may appear as a dark portion, whereby luminance unevenness may occur.

The present invention has been made in view of the problems described above. The present invention provides a technology suitable to obviate or reduce a decrease of the luminance level at both ends in the longitudinal direction of a light source, thereby reducing luminance unevenness.

According to the technology of the present invention, at least an inner surface of a side wall of a frame at both ends of a linear light source is inclined outward from the frame.

In accordance with an aspect of the present invention, there is provided a liquid crystal display device, including: a liquid crystal panel; and a backlight unit mounted on a back side of the liquid crystal panel to emit illumination light, wherein the backlight unit at least includes: a frame having side walls that are erected toward the liquid crystal panel from respective pairs of parallel opposing ends of a bottom portion; a linear light source attached so as to extend in parallel to one of the paired side walls; and a light diffusion plate inserted between the linear light source and the liquid crystal panel, and wherein the inner surfaces of the paired side walls arranged perpendicular to the linear light source have a reflecting surface that is inclined from the bottom portion so as to be opened in a direction toward the liquid crystal panel.

In the above aspect of the liquid crystal display device, the backlight unit may have two or more reflecting surfaces having different inclination angles on each of the side walls arranged perpendicular to the linear light source.

In the above aspect of the liquid crystal display device, the backlight unit may have the inclined reflecting surface at both sides of electrode portions of the linear light source.

In the above aspect of the liquid crystal display device, the side walls arranged perpendicular to the linear light source of the backlight unit may be constructed by at least one reflecting surface having a curved surface shape.

In the above aspect of the liquid crystal display device, the side walls arranged perpendicular to the linear light source of the backlight unit may be constructed by a plurality of reflecting surfaces having a stepped shape.

In the above aspect of the liquid crystal display device, the side walls arranged perpendicular to the linear light source of the backlight unit may be constructed by a plurality of reflecting surfaces of which the inclination angle gradually increases from the bottom portion of the frame.

In the above aspect of the liquid crystal display device, the side walls arranged perpendicular to the linear light source of the backlight unit may be constructed by a plurality of reflecting surfaces of which the inclination angle gradually decreases from the bottom portion of the frame.

In accordance with another aspect of the present invention, there is provided a liquid crystal display device, including: a liquid crystal panel; a plurality of linear light sources disposed on a rear surface side of the liquid crystal panel to irradiate light beams to the liquid crystal panel; and a rectangular frame disposed on a rear surface side of the linear light sources, wherein reflecting portions for reflecting light beams from the linear light sources to be irradiated to the liquid crystal panel are provided on inner wall surfaces of the frame, wherein the linear light sources are provided on a side surface of the frame so as to extend in a horizontal direction of the liquid crystal panel, wherein valleys are provided in portions of the reflecting portions provided on the side surfaces of the frame so as to surround the portions where the linear light sources are provided, and wherein the valleys form reflecting portions at the circumferences of the portions where the linear light sources are provided.

The valleys may be semi-elliptical when the side surfaces of the frame are observed from a display surface side of the liquid crystal panel. The cross-sections of the valleys that are perpendicular to a display surface of the liquid crystal panel or parallel to a horizontal direction of the liquid crystal panel may be curved surfaces. In the cross-sections perpendicular to a display surface of the liquid crystal panel or parallel to a horizontal direction of the liquid crystal panel, an angle between a tangential line of the curved surface of the valleys and a straight line parallel to the horizontal direction of the liquid crystal panel may differ depending on the position of the curved surface. The angle may gradually increase from a bottom surface of the frame toward the liquid crystal panel.

In addition, reflecting elements may be provided to the valleys so as to cover electrode portions of the linear light sources. The cross-sections of the reflecting elements that are perpendicular to a display surface of the liquid crystal panel or parallel to a vertical direction of the liquid crystal panel may be substantially arch shaped. The upper surfaces of the arch-shaped reflecting elements may have curved surfaces on cross-sections that are perpendicular to a display surface of the liquid crystal panel or parallel to a vertical direction of the liquid crystal panel.

In addition, the interfaces of the reflecting portions on the side surfaces of the frame and the valleys may be chamfered. The valleys may be provided to correspond to the plurality of linear light sources, and the shape of the interfaces of adjacent valleys face the center of the frame may be designed into a straight line shape or an arc shape as viewed from a display surface of the liquid crystal panel.

Other objects, features and advantages of the invention will become apparent from the following description of the embodiments of the invention taken in conjunction with the accompanying drawings.

DETAILED DESCRIPTION OF THE EMBODIMENT

Figure 1A:
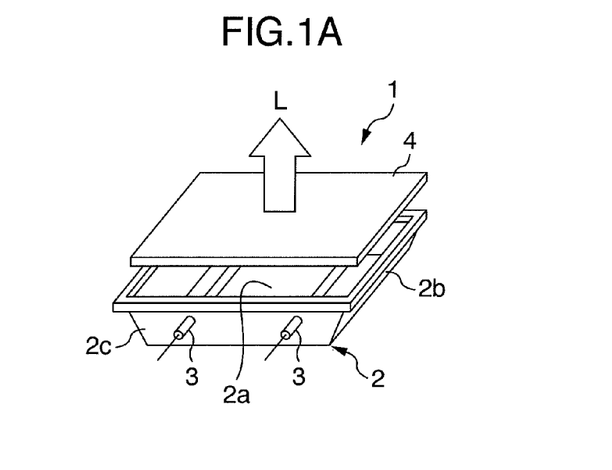
FIGS. 1A-1C are schematic diagrams for explaining an exemplary structure of a liquid crystal display device having a direct type backlight unit.
Figure 1B:
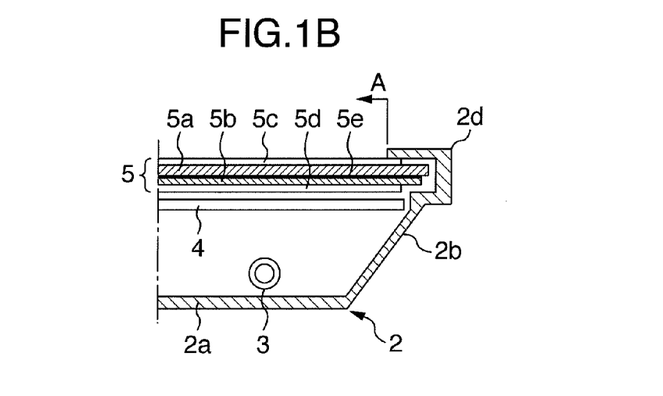

Hereinafter, embodiments of the present invention will be described in detail with reference to the drawings. FIG. 1 is a schematic diagram for explaining an exemplary structure of a liquid crystal display device having a direct type backlight unit. Specifically, FIG. 1A is a development perspective view showing only a backlight unit; FIG. 1B is a partly cross-sectional view for explaining the state where the backlight unit of FIG. 1A is mounted on a liquid crystal panel, taken along a direction perpendicular to a linear light source; and FIG. 1C is a partly cross-sectional view taken along a direction parallel to the linear light source of FIG. 1A.

As shown in FIG. 1A, a direct type backlight unit 1 at least includes a frame 2 having side walls 2b and 2c that are erected toward a liquid crystal panel from respective pairs of parallel opposing ends of a rectangular bottom plate 2a, linear light sources 3 attached so as to extend in parallel to one of the paired side walls 2b of an inner bottom portion of the bottom plate 2a of the frame 2, and a light diffusion plate 4 inserted between the linear light sources 3 and the liquid crystal panel. In this manner, the frame 2 according to this embodiment has a rectangular shape or a box-like shape.

The linear light sources 3 are cold cathode fluorescent lamps, for example, and in FIG. 1A, the light sources are provided along the bottom surface 2a to extend over the two side walls 2c in parallel to the other side walls 2b.

Figure 1C:
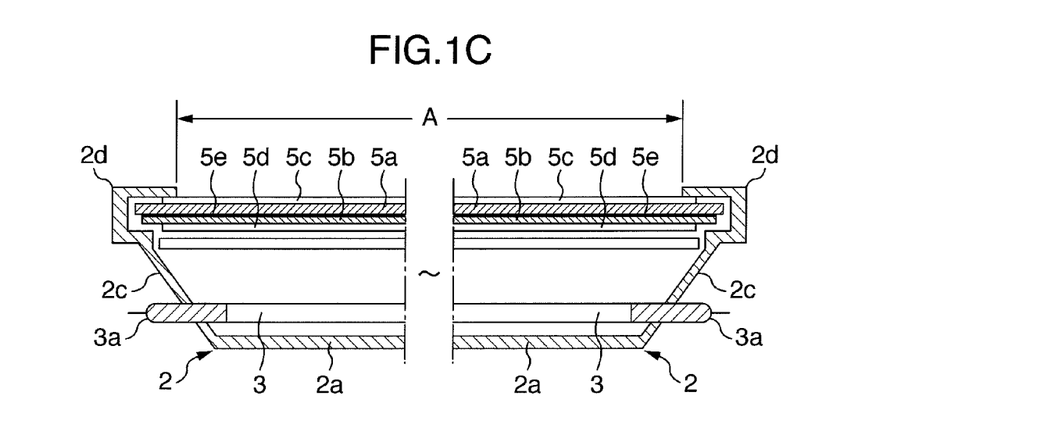

FIGS. 1B and 1C show the state where the backlight unit 1 is mounted on a rear side of a liquid crystal panel 5. The liquid crystal panel 5 is constructed such that a liquid crystal layer 5e is sandwiched between two transparent substrates (glass substrates) 5a and 5b and polarization plates 5c and 5d are laminated on the outer surfaces of the substrates 5a and 5b. The liquid crystal panel may be of a passive matrix type or an active matrix type, and an additional optical compensation film or the like may be laminated according to the type used. In the drawing, the area denoted by the arrow A is an effective display area of the liquid crystal panel 5 of a liquid crystal display device.

As shown in FIG. 1B, the bottom plate 2a and the side walls 2b that are parallel to the longitudinal direction of the linear light sources 3 have reflecting surfaces on at least their inner surfaces so that light beams emitted from the linear light sources 3 are reflected on the reflecting surfaces toward the liquid crystal panel 5, whereby light is efficiently utilized.

On the other hand, as shown in FIG. 1C, electrodes 3a for applying an electrical voltage are provided at both ends of the linear light sources 3, and light beams are not emitted from the electrodes 3a. Therefore, it is inevitable that the luminance at the ends of a liquid crystal panel is lower than that at the central portion thereof. However, the effective display area of the liquid crystal panel 5 is within the range denoted by the arrow A. That is, the effective display area extends above the portions of the electrodes 3. Such a low luminance problem may be resolved by forming the electrodes 3a outside the effective display area. However, recent liquid crystal display devices are becoming thinner and are also requested to have narrower frames. To meet such size requirements in a future liquid crystal display device, it is necessary to dispose the electrodes 3a inside the effective display area.

In order to cover the size requirements, like the side walls 2b of FIG. 1B, at least the inner surfaces of the side walls 2c of the frame 2 perpendicular to the linear light sources 3 are formed as a reflecting surfaces so that the reflecting surfaces function as a reflector that reflects light beams emitted from the linear light sources 3 at an oblique angle with respect to the liquid crystal panel 5 toward the liquid crystal panel 5, thereby efficiently utilizing the light.

Figure 2A:
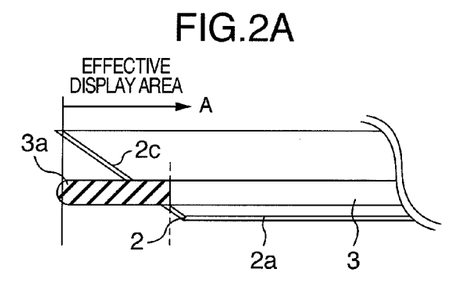
FIGS. 2A-2C are diagrams for explaining a luminance distribution adjacent to an end of an effective display area of a reflector of the present invention.
Figure 2B:
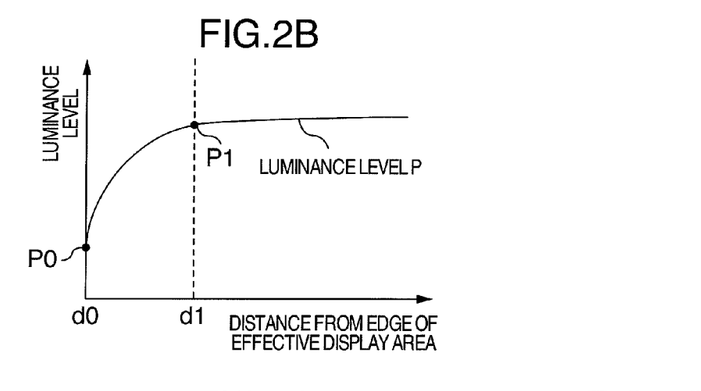
Figure 2C:
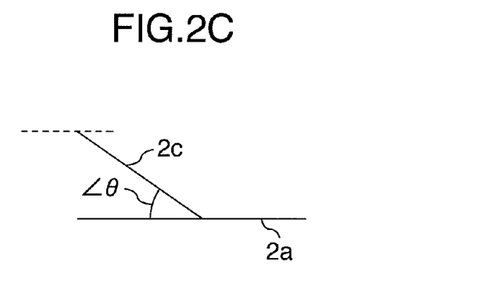

FIGS. 2A-2C are diagrams for explaining a luminance distribution on a region adjacent to an end of the effective display area of the left side wall 2c of FIG. 1C. Specifically, FIG. 2A is a schematic cross-sectional view showing the positional relationship between the linear light source 3, the electrode 3a, the left side wall 2c, and the bottom plate 2a. FIG. 2B is a graph for explaining qualitatively a luminance level of the liquid crystal panel 5 in a direction parallel to the linear light source 3 of FIG. 2A. In FIG. 2B, the horizontal axis represents a position (distance) in a direction parallel to the linear light source 3 from an end d0 of the effective display area toward the inside of the effective display area, and the vertical axis represents a luminance level. FIG. 2C is shown to refer to the relationship between a corresponding position and the electrode 3a of the linear light source 3 and is a schematic view showing that the bottom plate 2a and the left side wall 2c form reflector having an inclination angle θ with respect to each other. In this invention, a side wall perpendicular to the linear light source 3 is referred to as a reflector and is distinguished from other reflecting surfaces.

In the graph of FIG. 2B, it can be seen that the luminance level P decreases as the position moves closer to the end d0 from the inside of the effective display area. More specifically, the luminance level P scarcely decreased at positions from the inside of the liquid crystal panel 5 to the electrode 3a; while the luminance level P decreased remarkably from the position d1 (luminance level P1) of the electrode 3a and reached P0 at the end d0 of the effective display area. It has been known that, if the side wall 2c had not a reflecting function as a reflector, the luminance level P0 at the end d0 of the effective display area would have been decreased further to reach substantially zero.

As shown in FIG. 2B, the side wall 2c has an inclination angle θ with respect to the bottom plate 2a and is constructed as a reflecting surface to form a reflector in order to suppress decrease of a luminance level at the effective display area above the electrode 3a of the linear light source 3 where light beams are not emitted. However, the luminance level at the area above the electrode 3a is still insufficient.

Figure 3A:
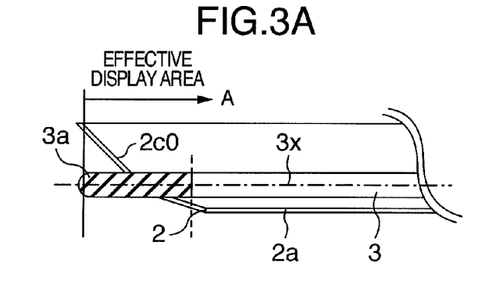
FIGS. 3A-3C are diagrams for explaining an embodiment of the reflector of the present invention.
Figure 3B:
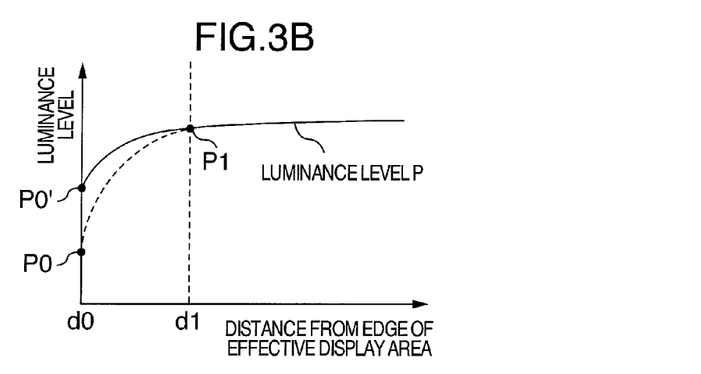
Figure 3C:
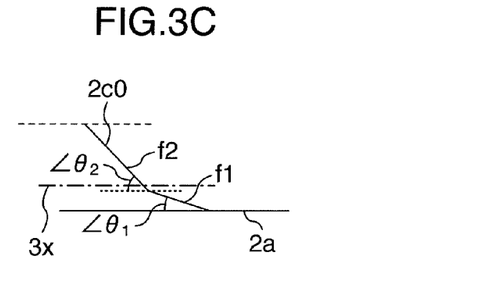

Next, another embodiment of the present invention will be described with reference to FIG. 3. FIG. 3 is a diagram for explaining an embodiment of the reflector of the present invention. The reflector has the same structure as that of FIG. 2 and has a side wall 2c0 having a shape different from that of the side wall 2c of the reflector shown in FIG. 2.

In the embodiment of FIG. 3, the reflecting surface of the side wall 2c0 is a reflector having at least two inclination angles. Alternatively, the reflecting surface is a reflector having at least two reflecting surfaces.

That is, as shown in the side wall 2c0 of FIG. 3A or 3C, the reflector of the embodiment of FIG. 3 has at least two different inclination angles or at least two inclined surfaces. Here, the inclined surface refers to two inclined surfaces f1 and f2 which constitute the reflector of the side wall 2c0 shown in FIG. 3C. For example, the reflector of the embodiment of FIG. 3 may have three inclined surfaces; and among these inclined surfaces, the two, upper and lower surfaces have the same inclination angle that is different from the inclination angle of an intermediate inclined surface. In FIG. 3B, the broken line represents the luminance level corresponding to that of FIG. 2 and the solid line represents the luminance level corresponding to FIG. 3A or 3C. According to this embodiment, as shown in FIG. 3B, the luminance level at the end d0 of the effective display area increased to P0'.

In the embodiment of FIG. 3, the height at which the inclination angle of the reflector changes is lower than an axial center 3x of the linear light source 3. However, the inclination angle changing height may be located higher than the axial center 3x of the linear light source 3. In addition, the inclination angle changing height may be set in terms of a tube diameter of the linear light source 3 rather than the height of the axial center 3x so as to be above or below the tube diameter. In either case, the interface of the bottom plate 2a and the side wall 2c0 is located at an inner side of the electrode 3a.

Figure 4:
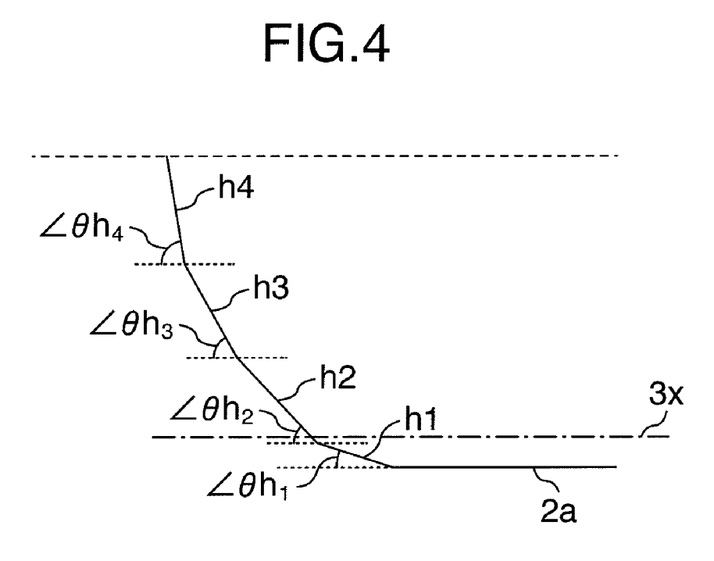
FIG. 4 is a diagram for explaining an embodiment of the reflector of the present invention.

Next, another embodiment of the present invention will be described with reference to FIG. 4. FIG. 4 is a diagram for explaining an embodiment of the reflector of the present invention.

Similar to FIG. 2C or 3C, FIG. 4 is a schematic view showing a simplified shape of the reflector of the present invention and the bottom plate 2a, as viewed from a transversal direction. In the drawing, the one-dot-chain line is the axial center 3x of the linear light source 3.

FIG. 4 shows a cross-section of the reflector perpendicular to the display surface of the liquid crystal panel 5 and parallel to a horizontal direction (i.e., the longitudinal direction of the linear light source 3) of the liquid crystal panel. The reflector (side wall) of FIG. 4 is an embodiment wherein the number of inclined surfaces is four. The inclined surfaces h1 to h4 are formed by line segments that touch the interior of a curve (not shown) such as a parabola (hereinafter, referred to curve used as a reference). Therefore, the inclination angles of the inclined surfaces h1 to h4, . . . , and hn, that is, the angles between the inclined surfaces and a straight line parallel to the display surface of the liquid crystal panel 5 satisfy the following relationship.

$$\theta h1 < \theta h2 < \theta h3 < \theta h4 < \ldots < \theta hn \qquad \text{Formula (1)}$$

Figure 5:
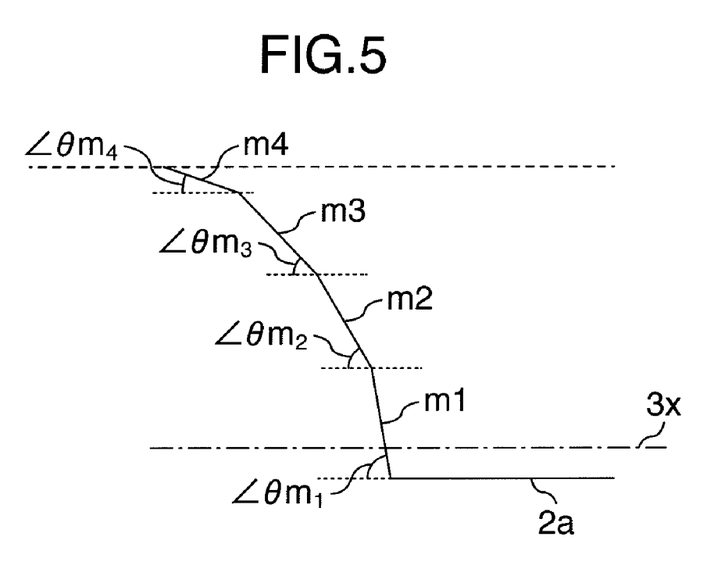
FIG. 5 is a diagram for explaining an embodiment of the reflector of the present invention.

When the number of inclined surfaces is increased to infinite, the surfaces will be curve. Therefore, the figure of the inclined surface of the side wall (reflector) of the present invention may include a curve. In addition, as shown in FIG. 5, a curve such as a parabola may be reversed upside down so that the inclination angles satisfies the following relationship.

$$\theta h1 > \theta h2 > \theta h3 > \theta h4 > \ldots > \theta hn \qquad \text{Formula (2)}$$

In this case, the inclined surfaces are formed by line segments that touch the exterior of a curve such as a parabola.

The number of curves used as a reference may be more than one, and a plurality of identically or differently shaped curves may be used.

In addition, all the edges of the corner portions at interfaces of the inclined surfaces may be cut smooth so as to form a curve.

In addition, a curve may be divided at a predetermined proportion so as to form stepped side walls. In this case, the curve may be divided at a uniform proportion in both the height direction and the transversal direction and may be divided at mutually different proportions in the height and transversal directions. For example, when the angle between a tangential line of a curve and the bottom plate 2a is small, the proportion of division may be increased.

Next, another embodiment of the present invention will be described with reference to FIG. 5. FIG. 5 is a diagram for explaining an embodiment of the reflector of the present invention.

Similar to FIG. 2C or 3C, FIG. 5 is a schematic view showing a simplified shape of the reflector of the present invention and the bottom plate 2a, as viewed from a transversal direction. In the drawing, the one-dot-chain line is the axial center 3x of the linear light source 3. FIG. 5 shows an embodiment wherein the curve such as a parabola used as a reference is reversed upside down from that of FIG. 4. That is, the inclination angles satisfy the following relationship.

$$\theta m1 > \theta m2 > \theta m3 > \theta m4 > \ldots > \theta mn \quad \text{Formula (3)}$$

Figure 6:
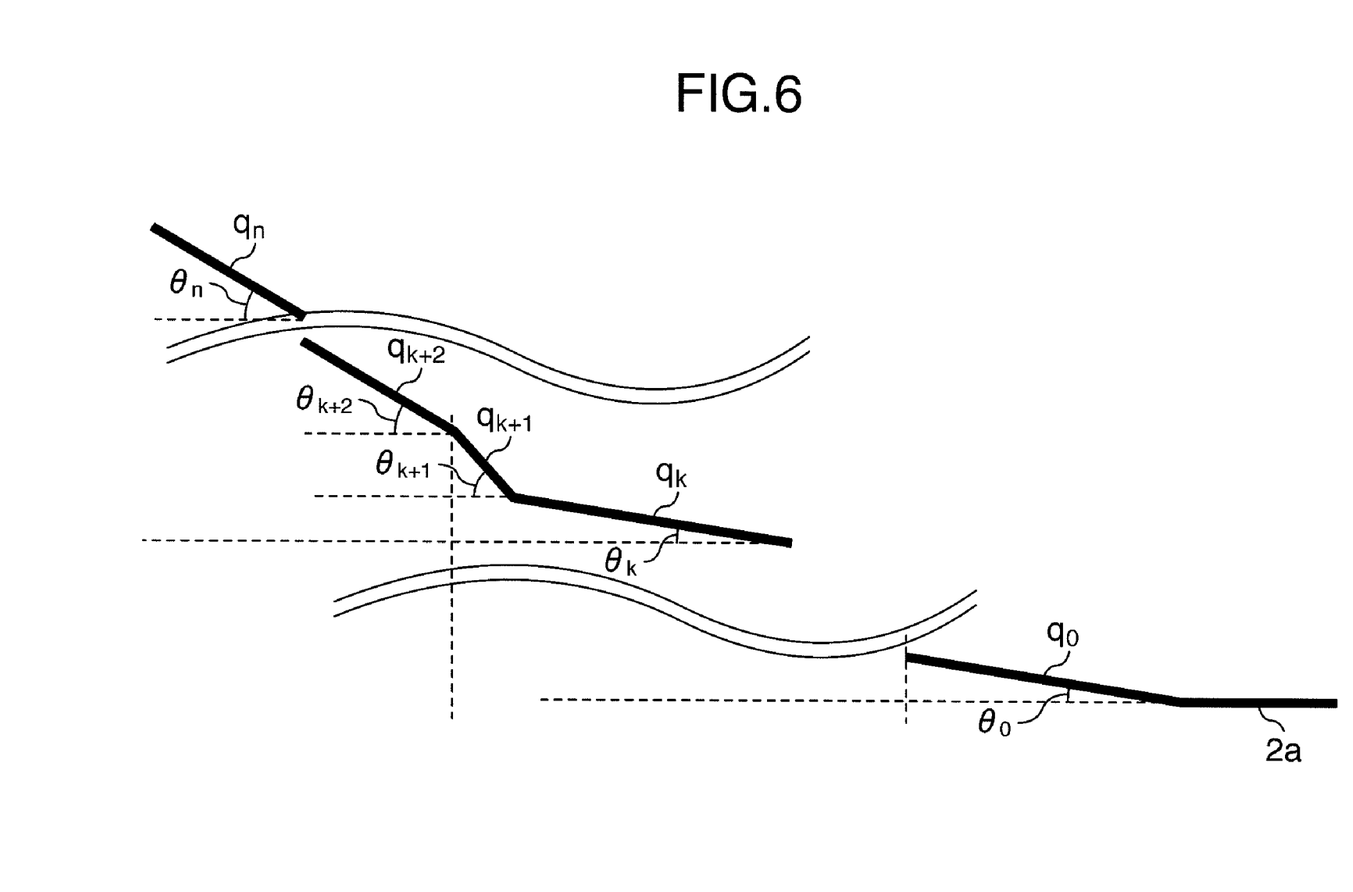
FIG. 6 is a diagram for explaining an embodiment of the reflector of the present invention.

Next, another embodiment of the present invention will be described with reference to FIG. 6. FIG. 6 is a diagram for explaining an embodiment of the reflector of the present invention.

Similar to FIG. 2C or 3C, FIG. 6 is a schematic view showing a simplified shape of the reflector of the present invention and the bottom plate 2a from a transversal direction.

As shown in FIG. 6, when a reflector has three or more inclined surfaces, the inclination angles of the inclined surfaces satisfy the following relationship, in which the inclined surfaces are denoted, in order from the bottom surface (bottom plate 2a), by q0, ..., qk, qk+1, qk+2, ..., qn (n and k are integer, $0 \leq k < n$).

$$\theta k < \theta k+1 \text{ and } \theta k+1 > \theta k+2 \quad \text{Formula (4); or}$$

$$\theta k > \theta k+1 \text{ and } \theta k+1 < \theta k+2 \quad \text{Formula (5)}$$

That is, in the embodiment of FIG. 4 or 5, the inclination angles of the reflecting surfaces of the reflector are increased or decreased monotonously as they went upward.

However, in the embodiment of FIG. 6, the inclination angles of the reflecting surfaces of the reflector are composed of irregular inclination angles rather than increasing or decreasing monotonously. Therefore, the reflector is formed by uneven or irregular surfaces.

In addition, the edges of the uneven portions at interfaces of the reflecting surfaces may be cut smooth so as to form a curve.

Next, another embodiment of the present invention will be described. In the embodiments described above, all the reflectors were constructed by a plurality of inclined reflecting surfaces having a plurality of inclination angles with respect to the longitudinal direction of the linear light source. However, in another embodiment of the present invention, an inclined structure is provided so that it inclines perpendicularly with respect to the linear light source at a side surface thereof.

Figure 7:
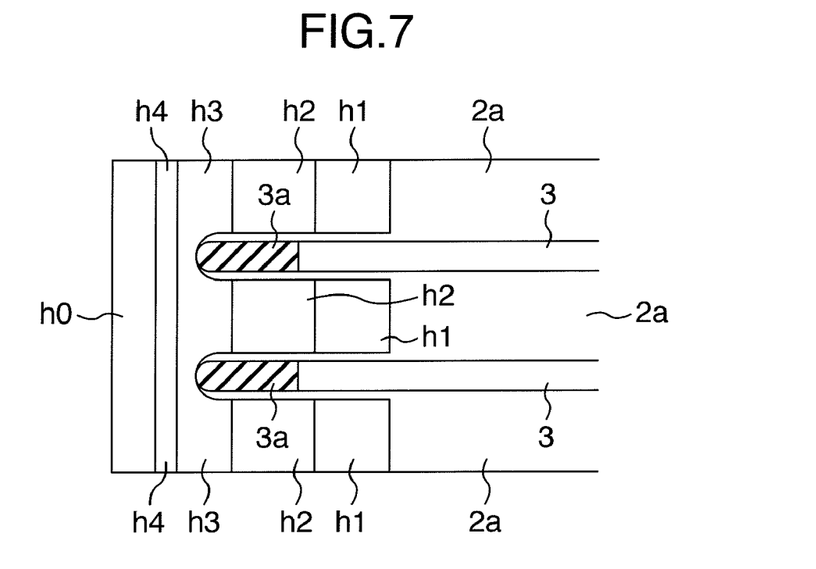
FIG. 7 is a diagram for explaining an embodiment of the reflector of the present invention.

FIG. 7 is a diagram showing a reflector portion of the embodiment of FIG. 4, as viewed from the above. For the sake of explanation, the liquid crystal panel portion is not shown. In addition, only two linear light sources and the left end portions are shown.

FIG. 7 is a schematic view of the reflector shown in FIG. 4, as viewed from the above. The inclined surfaces h1 to h4 are erected from the bottom plate 2a and reach the liquid crystal panel. In the drawing, h0 represents a portion of the liquid crystal panel in contact with a frame portion (outside the effective display area).

Figure 8:
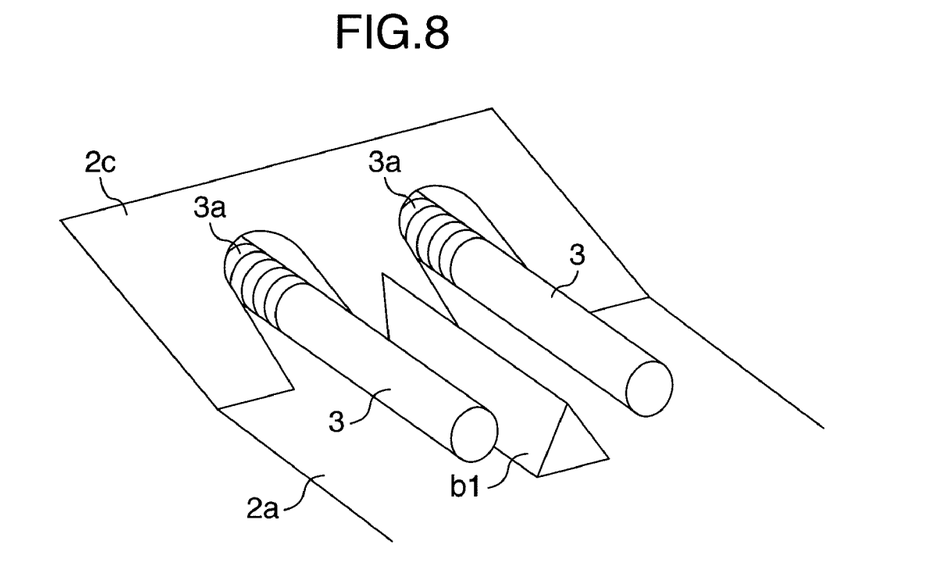
FIG. 8 is a diagram for explaining an embodiment of the reflector of the present invention.
Figure 9:
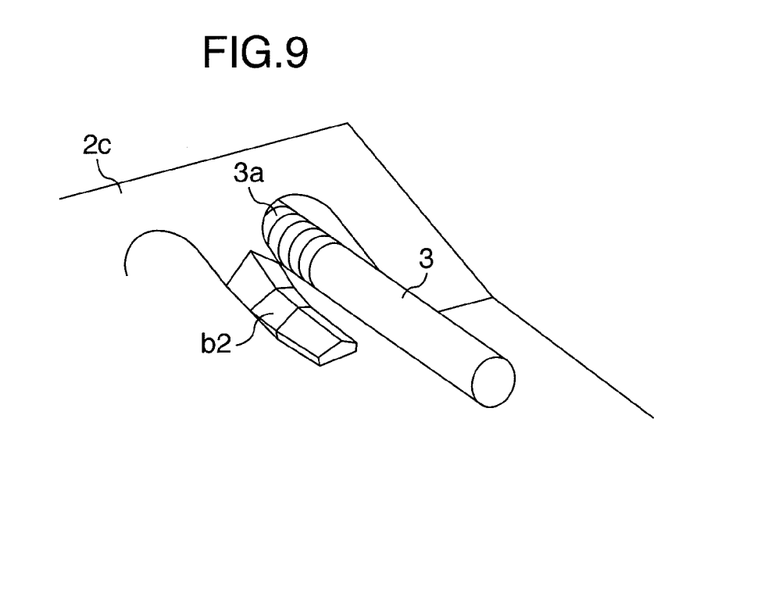
FIG. 9 is a diagram for explaining an embodiment of the reflector of the present invention.

Next, another embodiment of the present invention will be described with reference to FIGS. 8 and 9. FIGS. 8 and 9 are diagrams for explaining an embodiment of the reflector of the present invention.

Unlike the reflector of the embodiments described above wherein an inclined structure is provided so as to reflect light beams in the longitudinal direction of the linear light source; in the embodiment of FIGS. 8 and 9, however, an inclined structure is provided so as to reflect light beams in a direction perpendicular to the longitudinal direction of the linear light source.

In FIG. 8, a triangular pyramid-shaped reflector is provided on the side wall 2c in parallel to and between the two parallel, linear light sources 3. In addition, in FIG. 8, for the sake of explanation, only two linear light sources are shown, and the bottom plate 2a and the reflector b1 are shown up to intermediate portions thereof.

The number of linear light sources 3 and the number of reflectors b1 are arbitrary. In addition, the reflector b1 may extend to the other end (not shown) or may extend only to an intermediate position.

In the reflector of FIG. 9, an inclined structure in a direction parallel to the linear light sources 3 is provided on the inclined surface of the one of the above-mentioned embodiments, e.g. the embodiment shown in FIG. 4.

By providing such an inclined structure, light beams emitted from the linear light sources can be effectively reflected in a direction perpendicular to the longitudinal direction of the linear light source 3 in addition to in the longitudinal direction. As a result, the luminance level at the end of the effective display area can be increased further.

Incidentally, in FIG. 9, although only one linear light source 3 is shown for easy understanding of the structure of the reflector b2, it is needless to say that an identical linear light source 3 is provided on the left side. Similarly, the bottom plate 2a and the linear light source 3 are shown up to intermediate portions thereof.

The number of linear light sources 3 and the number of reflectors b2 are arbitrary. In addition, the reflector b2 may extend to the other end (not shown) or may extend only to an intermediate position.

In this way, according to the embodiments of FIGS. 4 to 9, the luminance level at the ends of the effective display area can be increased close to the luminance level in the inside thereof; therefore, it is possible to reduce or eliminate the decrease of the luminance level at the ends of the liquid crystal panel.

That is, in a thin liquid crystal display device, a decrease of the luminance level of the liquid crystal panel at both ends in the longitudinal direction of the linear light source can be reduced, thereby improving the light emission quality. In addition, frames can be narrowed.

In the embodiments described above, the reflector has the same shape over the entire portions of the liquid crystal panel. However, the reflector may have different shapes in a direction perpendicular to the axial direction of the linear light source so that the shape in a central portion of the liquid crystal panel is different from the shape at both ends of the liquid crystal panel. In addition, the shape of the reflector may change in an alternating manner or in a specified order.

In the embodiments described above, the reflecting surface of the reflector is usually subjected to surface treatment such as mirror-finishing or polishing in order to increase reflection efficiency. However, the surface may be roughened by means of blaster for the purpose of providing both light reflection and diffusion properties so that the luminance distribution of the liquid crystal panel becomes more uniform. In this case, after roughening the surface, a reflecting film may be formed thereon to increase reflectance.

While embodiments of the present invention have been described above, it should be understood that they have been presented by way of example only, and the invention is not limited by the embodiments. It will be apparent to those persons skilled in the art that various changes can be made therein without departing from the spirit and scope of the present invention.

Figure 10:
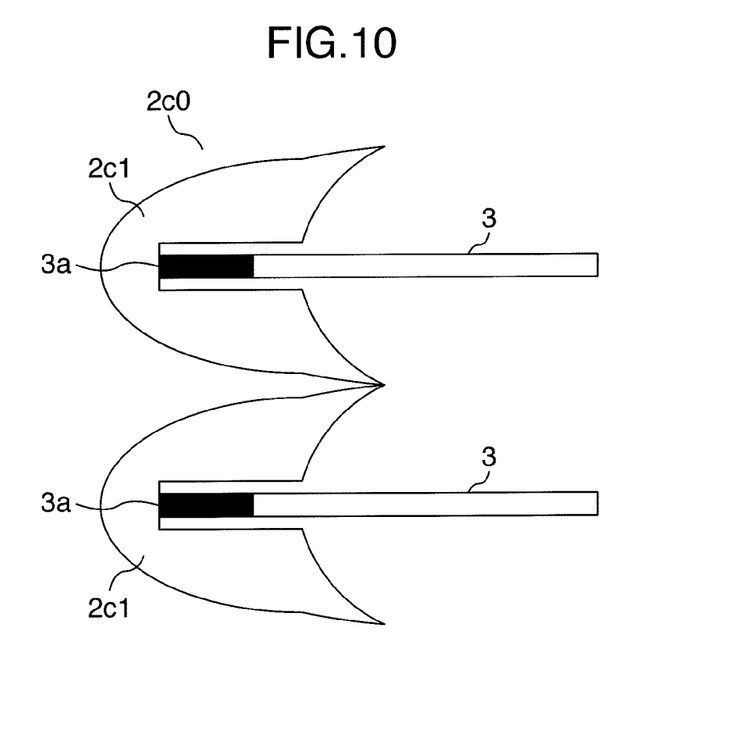
FIG. 10 is a diagram for explaining another embodiment of the reflector of the present invention.

Next, another embodiment of the present invention will be described with reference to FIG. 10. FIG. 10 is a diagram showing an embodiment of the reflector of the present invention as viewed from the side of an irradiation surface of a backlight unit (i.e., from the display surface of the liquid crystal panel 5). In this embodiment, the reflecting portion 2c0 is provided in the side surface 2c of the frame 2 and valleys 2c1 are formed in the reflecting portion 2c0. The valleys 2c1 are formed in the reflecting portion 2c0 provided in the side surface 2c of the frame 2 so as to surround the portions where the electrode portions 3a of the linear light sources 3 are provided. In this embodiment, the valleys 2c1 (hereinafter, referred to as valley-shaped reflecting portions) are provided to correspond to each of the plural linear light sources 3. As is obvious from FIG. 10, the valley-shaped reflecting portions 2c1 are semi-elliptical as viewed from the display surface side of the liquid crystal panel 5. In other words, in this embodiment, the circumferences of the reflecting portions 2c0, provided in the side surface 2c of the frame 2, around the electrode portions 3a of the linear light sources 3 are bent three-dimensionally.

The valley-shaped reflecting portion 2c1 can provide a light focusing effect thanks to its bent shape so that light beams are focused to the circumferences of the electrode portions 3a. The shape of the valleys 2c1 may be a spheroid, a paraboloid, or a cylinder, for example. The valleys 2c1 may also be formed by combining these plural shapes or approximating any one of these plural shapes by plural planes. According to this embodiment, light beams emitted from the linear light sources 3 are incident to the valley-shaped reflecting portions 2c1 and focused onto the circumferences of the electrode portions 3a, whereby it is possible to prevent lowering of the luminance level at the electrode portions 3a.

Figure 11A:
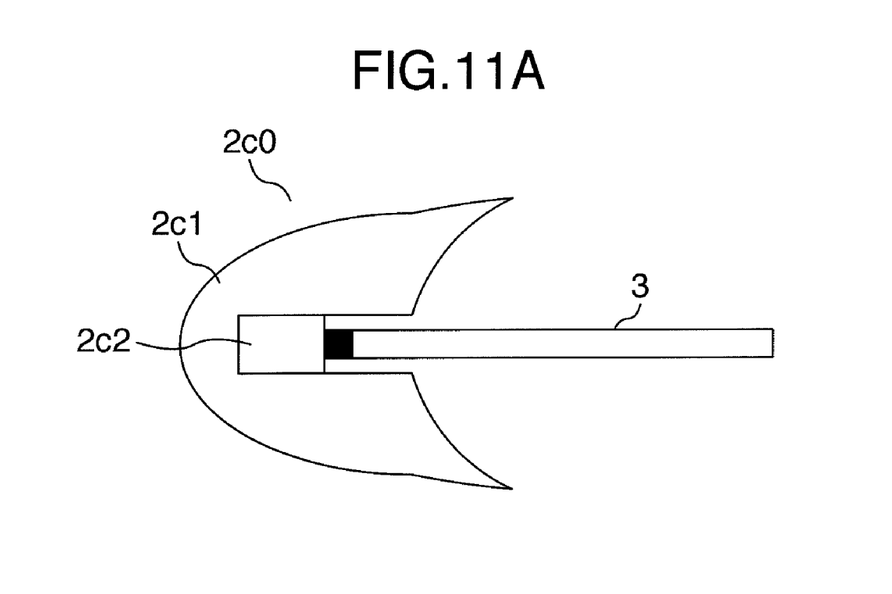
FIGS. 11A and 11B are diagrams for explaining another embodiment of the reflector of the present invention.
Figure 11B:
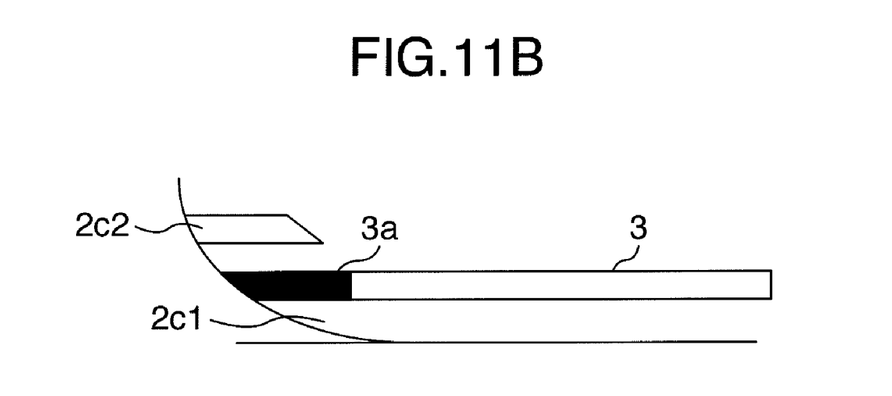

Next, another embodiment of the present invention will be described with reference to FIG. 11. FIG. 11 is a diagram showing an embodiment of the reflector of the present invention. Specifically, FIG. 11A is a view viewed from an irradiation surface of a backlight unit (i.e., from the side of the display surface of the liquid crystal panel 5). FIG. 11B is a view viewed from the side surface of the backlight unit and shows a cross-section of the reflector perpendicular to the display surface of the liquid crystal panel 5 or parallel to the horizontal direction (the longitudinal direction of the linear light source 3) of the liquid crystal panel, taken along the central axis of the linear light source 3. In this embodiment, in addition to the arrangement of the embodiment of FIG. 10, convex-shaped reflecting elements 2c2 is provided above the electrode portions 3a of the linear light sources 3. The convex-shaped reflecting elements 2c2 are provided at portions of the valley-shaped reflecting portions 2c1 corresponding to the upper portions of the electrode portions 3a of the linear light sources 3 and are convex toward the liquid crystal panel 5.

The convex-shaped reflecting elements 2c2 can provide an effect of recovering the luminance level at the circumferences of the electrode portions 3a by reflecting light beams to an irradiation surface around the electrode portions 3a. The shape of the convex-shaped reflecting elements 2c2 is formed by at least one flat surface or at least one curved surface, for example. The convex-shaped reflecting elements may be inclined with respect to the bottom portion 2a and may be curved surfaces having an inflection point. The convex-shaped reflecting elements 2c2 may have a thickness of 0.3 mm or more in order to maintain strength. A gap between the electrode portion 3a and the reflecting element 2c2 may be 0.2 mm or more in order to prevent collision of the linear light sources 3 and the convex-shaped reflecting elements 2c2, thereby preventing damage of the linear light sources 3 or the valley-shaped reflecting portions 2c1. The convex-shaped reflecting elements 2c2 can reflect light beams emitted from the linear light sources 3 toward above the electrode portions 3a, thereby preventing lowering of the luminance level due to the electrode portions 3a.

Figure 12A:
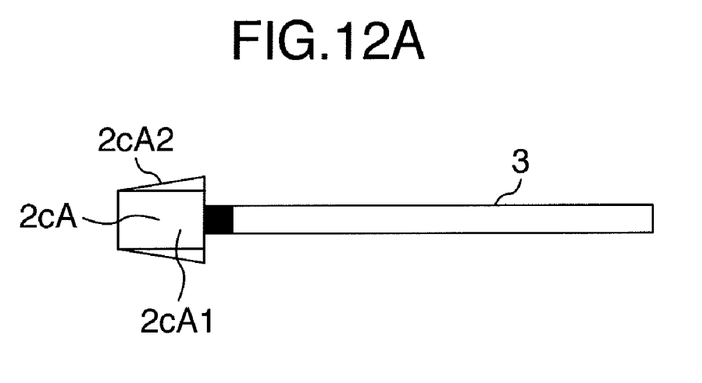
FIGS. 12A-12C are diagrams for explaining another embodiment of the reflector of the present invention.
Figure 12B:
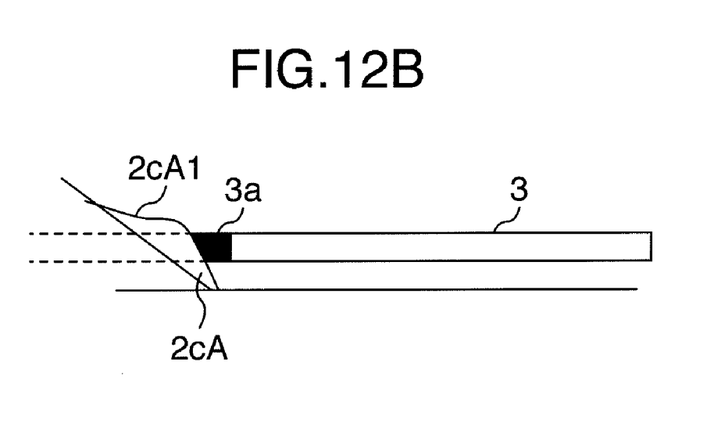
Figure 12C:
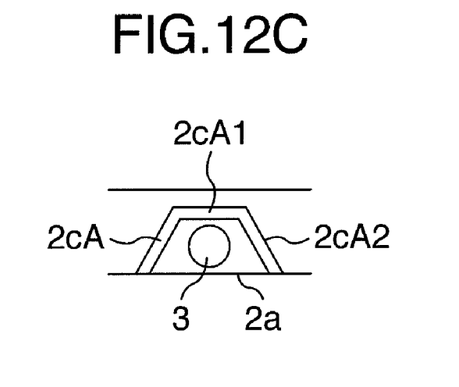

Next, another embodiment of the present invention will be described with reference to FIG. 12. FIGS. 12A and 12B are diagrams showing an embodiment of the reflector of the present invention as viewed from the side surface of the backlight unit and shows a cross-section of the reflector perpendicular to the display surface of the liquid crystal panel 5 and parallel to the horizontal direction (the longitudinal direction of the linear light source 3) of the liquid crystal panel, taken along the central axis of the linear light source 3. FIG. 12C shows a cross-section of the reflector perpendicular to the display surface of the liquid crystal panel 5 or parallel to the vertical direction (a direction vertical to the longitudinal direction of the linear light source 3) of the liquid crystal panel. In this embodiment, arch-shaped reflecting elements 2cA are provided in the reflecting portions 2c0 so as to cover the electrode portions 3a of the linear light sources 3. As is obvious from FIG. 12C, the arch-shaped reflecting element 2cA has an arch-shaped or trapezoidal cross-section that is perpendicular to the display surface of the liquid crystal panel 5 and parallel to the vertical direction of the liquid crystal panel. The arch-shaped reflecting element 2cA has an upper surface 2cA1 and side surfaces 2cA2.

The arch-shaped reflecting elements 2cA can provide an effect of recovering the luminance level at the circumferences of the electrode portions 3a by reflecting light beams incident from the sides of the electrode portions to an irradiation surface. The arch-shaped reflecting elements 2cA can reflect light beams emitted from the linear light sources 3 and incident to the electrode portions 3a toward above the circumferences of the electrode portions 3a, thereby preventing lowering of the luminance level at the circumferences of the electrode portions 3a. To prevent the luminance level at both ends of the backlight unit from lowering, it is necessary to set the inclination of the reflecting portion 2c0 to about 30 degrees to about 80 degrees. However, if the inclination is too steep, there is a problem that the electrode portions 3a are visible. Conventionally, in order to prevent the electrodes from entering the effective display area, the linear light source 3 is made long for example; however, this raises a problem that the size of the backlight unit will be longer. According to this embodiment, when the backlight unit has a thickness of 10 mm or more, even if the electrodes 3a are exposed to the outside from the arch-shaped reflecting elements 2cA by a length of about 3 mm, it is possible to keep uniform luminance.

As shown in FIG. 12B, the arch-shaped reflecting elements 2cA have a curved, upper surface 2cA1 viewed in a cross-section that is perpendicular to the display surface of the liquid crystal panel 5 and parallel to the horizontal direction of the liquid crystal panel. In this embodiment, the upper surface 2cA1 has a reclined S-shape. As shown in FIG. 12C, the arch-shaped reflecting elements 2cA have an arch shape or a trapezoidal shape, and the side surfaces 2cA2 are inclined with respect to the bottom portion 2a of the frame 2. The shape of the arch-shaped reflecting elements 2cA is formed by at least one flat surface or at least one curved surface, for example.

A gap between the arch-shaped reflecting element 2cA and the linear light source 3 may be 0.2 mm or more in order to prevent collision of the linear light sources 3 and the reflecting elements 2c2, thereby preventing damage of the linear light sources 3 or the valley-shaped reflecting portions 2c1 and/or the reflecting portions 2c0 on the side surfaces 2c of the frame. In addition, it is possible to prevent interference due to thermal expansion of the valley-shaped reflecting portions 2c1 and/or the reflecting portions 2c0. Furthermore, since the arch-shaped reflecting elements 2cA are inclined, incident light beams can be effectively reflected toward above the electrode portions 3a, thereby preventing lowering of the luminance level at the electrode portions 3a.

Figure 13:
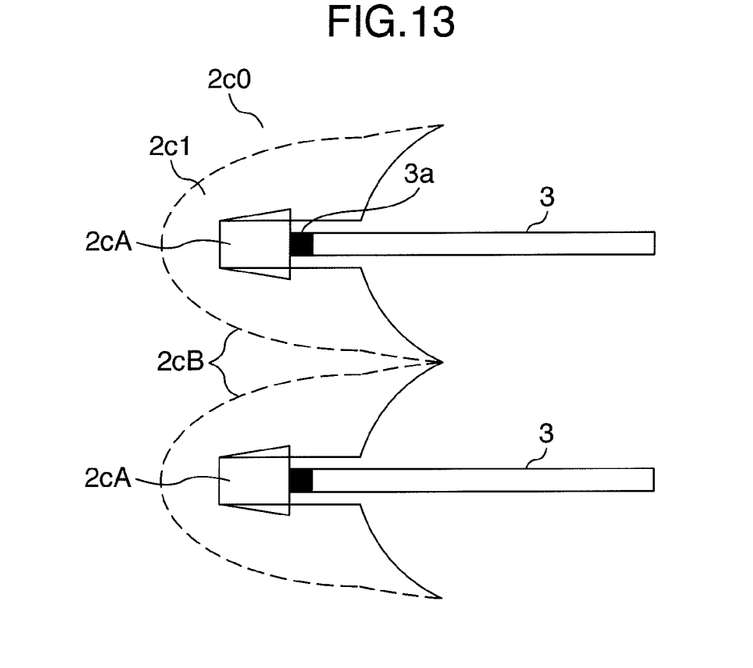
FIG. 13 is a diagram for explaining another embodiment of the reflector of the present invention.

Next, another embodiment of the present invention will be described with reference to FIG. 13. FIG. 13 is a diagram showing an embodiment of the reflector of the present invention as viewed from an irradiation surface of the backlight unit. As shown in the drawing, an interface 2cB between the reflecting portion 2c0 on the frame side surface 2c and the valley-shaped reflecting portion 2c1 and an interface 2cB between adjacent valley-shaped reflecting portions 2c1 are chamfered to form chamfered portions R, and to connect these portions smoothly. The interfaces may be connected smoothly to form a part of a spherical surface, a cylindrical surface, or other curved surfaces. According to the places, the chamfered portions R may have a radius of curvature of about 0.3 mm to about 5 mm. However, the radius of curvature of the chamfered portions R is not limited to this range. If the interface 2cB of the reflecting portion 2c0 on the frame side surface 2c and the valley-shaped reflecting portion 2c1 and the interface 2cB of adjacent valley-shaped reflecting portions 2c1 are not smoothly formed, the luminance distribution of the reflecting light beams may change abruptly at these interfaces. As a result, these interfaces 2cB are visible on the irradiation surface. According to this embodiment, by forming these interfaces 2cB smoothly, it is possible to prevent abrupt change of the luminance level on the irradiation surface, thereby preventing occurrence of luminance unevenness. Therefore, in this embodiment, it is possible to provide improved luminance evenness when images displayed on the display surface of the liquid crystal panel 5 are observed by the human eyes.

Figure 14:
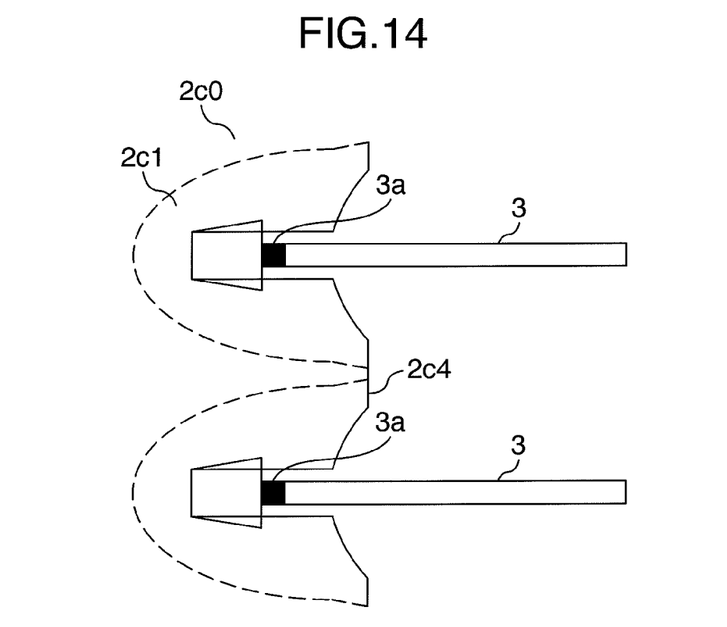
FIG. 14 is a diagram for explaining another embodiment of the reflector of the present invention.

Next, another embodiment of the present invention will be described with reference to FIG. 14. FIG. 14 is a diagram showing an embodiment of the reflector of the present invention as viewed from an irradiation surface of the backlight unit and is a schematic view showing a simplified shape of the reflector of this embodiment. In the embodiments described above, there is a possibility that sharp edges may be formed at intersection of the adjacent valley-shaped reflecting portions 2c1. Therefore, when an operator mounts the reflecting portions 2c0 by hand of the operator during assembly of a backlight unit, there is a danger that the sharp edges may hurt the operator. In this embodiment, the sharp edges are cut to have a flat surface, thereby ensuring safety of the operator. That is, in this embodiment, the shape of the intersection of the adjacent valley-shaped reflecting portions 2c1 face the central portion of the frame 2 is designed into a straight line shape 2c4 as viewed from the display surface side of the liquid crystal panel 5. In the example of FIG. 14, the intersection is shaped as straight line shaped; however, the intersection may be designed into an arc shape that is convex to the center of the frame 2. In addition, the intersection may be chamfered to form chamfered portions R.

In the embodiments described above, the valley-shaped reflecting portions 2c1 and the arch-shaped reflecting elements 2cA have the same shape over the entire portions of the liquid crystal panel. However, they may have different shapes in a direction perpendicular to the axial direction of the linear light source so that the shape in a central portion of the liquid crystal panel is different from the shape at both ends of the liquid crystal panel. In addition, the shape of the reflecting portions and elements may change in an alternating manner or in an arbitrary order.

In the embodiments described above, the valley-shaped reflecting portions 2c1 and the arch-shaped reflecting elements 2cA are usually constructed by a reflective diffusion sheet or coat in order to increase reflection efficiency. However, the surface may be subjected to surface treatment such as mirror-finishing or polishing for providing a high glossiness or roughened by means of blaster for the purpose of providing light diffusion properties so that the luminance distribution of the liquid crystal panel becomes more uniform. In this case, after roughening the surface, a reflecting film may be formed thereon to increase reflectance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device, comprising:
   a liquid crystal panel;
   a plurality of linear light sources disposed on a rear surface side of the liquid crystal panel to irradiate light beams to the liquid crystal panel; and
   a rectangular frame disposed on a rear surface side of the linear light sources,
   wherein reflecting portions for reflecting light beams from the linear light sources to be irradiated to the liquid crystal panel are provided on inner wall surfaces of the frame,
   wherein the linear light sources are provided on a side surface of the frame so as to extend in a horizontal direction of the liquid crystal panel,
   wherein valleys are provided in portions of the reflecting portions provided on the side surfaces of the frame so as to surround the portions where the linear light sources are provided, and
   wherein the valleys form curved reflecting portions at the circumferences of the portions where the linear light sources are provided,
   wherein the light beams from the linear light sources are focused onto the circumferences of electrode portions of the linear light sources by the curved reflecting portions.

2. The liquid crystal display device according to claim 1, wherein the valleys are semi-elliptical when the side surfaces of the frame are observed from a display surface side of the liquid crystal panel.

3. The liquid crystal display device according to claim 1, wherein cross-sections of the valleys that are perpendicular to a display surface of the liquid crystal panel are parallel to a horizontal direction of the liquid crystal panel are curved surfaces.

4. The liquid crystal display device according to claim 3, wherein in the cross-sections perpendicular to a display surface of the liquid crystal panel and parallel to a horizontal direction of the liquid crystal panel, an angle between a tangential line of the curved surface of the valleys and a straight line parallel to the horizontal direction of the liquid crystal panel differs depending on the position of the curved surface.

5. The liquid crystal display device according to claim 4, wherein the angle gradually increases from a bottom surface of the frame toward the liquid crystal panel.

6. The liquid crystal display device according to claim 1, wherein reflecting elements are provided to the valleys so as to cover electrode portions of the linear light sources.

7. The liquid crystal display device according to claim 6, wherein cross-sections of the reflecting elements that are perpendicular to a display surface of the liquid crystal panel or parallel to a vertical direction of the liquid crystal panel are substantially arch shaped.

8. The liquid crystal display device according to claim 7, wherein upper surfaces of the arch-shaped reflecting elements have curved surfaces on cross-sections that are perpendicular to a display surface of the liquid crystal panel and parallel to a vertical direction of the liquid crystal panel.

9. The liquid crystal display device according to claim 1,
wherein the valleys are provided to correspond to each of the plurality of linear light sources, and
wherein the shape of the interfaces of adjacent valleys face the center of the frame is designed into a straight line shape or an arc shape as viewed from a display surface side of the liquid crystal panel.

* * * * *